United States Patent
Hoffman et al.

(10) Patent No.: US 6,327,265 B1
(45) Date of Patent: Dec. 4, 2001

(54) ACCELERATED MULTI-FORMAT COMMUNICATION USING A PREFIX TO IDENTIFY THE TRANSMITTER FORMAT

(75) Inventors: Edwin Hoffman, Brielle; Paul Wray Osborne, Neptune, both of NJ (US)

(73) Assignee: Interlogix, Inc., Austin, TX (US)

( * ) Notice: Subject to any disclaimer, the term of this patent is extended or adjusted under 35 U.S.C. 154(b) by 0 days.

(21) Appl. No.: 09/024,233

(22) Filed: Feb. 17, 1998

(51) Int. Cl.[7] .............................. H04B 1/44; H04L 12/26; H04J 3/22

(52) U.S. Cl. ............................................. 370/465; 370/522

(58) Field of Search ..................................... 370/278, 282, 370/410, 465, 466, 467, 522, 524, 401, 402; 375/222

(56) References Cited

U.S. PATENT DOCUMENTS

| 5,426,637 | * | 6/1995 | Derby | 370/401 |
| 5,475,818 | * | 12/1995 | Molyneaux et al. | 709/208 |
| 5,611,048 | * | 3/1997 | Jacobs et al. | 713/202 |
| 5,949,861 | * | 9/1999 | Chan et al. | 379/100.17 |
| 5,961,626 | * | 10/1999 | Harrison et al. | 710/129 |

* cited by examiner

*Primary Examiner*—Chau Ngyuen
*Assistant Examiner*—Soon-Dong Hyun
(74) *Attorney, Agent, or Firm*—Stoel Rives LLP

(57) ABSTRACT

A location or other description of the source of a transmission is inserted into the communication as a prefix to transmitter data. A multi-format receiver emits a sequence of different handshakes until the transmitter begins to respond. The receiver stores the prefix and a descriptor of the last handshake prior to the transmitter response. Subsequent signals with a stored prefix are greeted immediately with the stored associated handshake.

1 Claim, 1 Drawing Sheet

ACCELERATED MULTI-FORMAT COMMUNICATION USING A PREFIX TO IDENTIFY THE TRANSMITTER FORMAT

BACKGROUND OF THE INVENTION

1. Field of the Invention

Electronic Communications, Telephonic Communications

2. Description of the Related Art

Communications between transmitters and receivers follow specific protocols and formats. The rapid development of such devices as modems, fax, personal communicators and security services has resulted in a large number of different formats. The format used often varies from one model to another even in devices performing the same function and made by the same manufacturer. In lieu of receivers dedicated to receive a particular transmission format, it is preferable to use receivers which can adapt to different formats readily.

A receiver which adapts automatically to different formats is described by present applicants in U.S. Pat. No. 6,034,619. In general, transmitters attempting to communicate with a receiver will not begin to send data until they have confirmation that a connection to the receiver is made. Once a connection is made, the receiver emits a signal, sometimes referred to as a handshake signal, which will then cause the transmitter to begin to send its data. Different transmitters require different handshake signals and the data format will vary also. The mentioned Patent describes a receiver designed to emit a sequence of different handshakes corresponding to different data formats which is capable to adapt to different data formats and to communicate with different types of transmitters.

The proliferation of different protocols has resulted in the need to emit a sequence of many different types of handshakes. When the transmitter detects its corresponding handshake, it starts its transmission and the receiver then stops emitting its handshake sequence. It is of interest to shorten the sequence, since the time for the transmitter to wait for its corresponding handshake would then be reduced. It is also advantageous to prevent any extraneous and unnecessary signals from being emitted. Such signals are potential causes of unreliability and problems to the signaling environment.

SUMMARY OF THE INVENTION

The location or other description of the source of a transmission is inserted into the communication as a prefix to data. A receiver capable of communicating in many different protocols and formats emits a sequence of different handshakes until the transmitter begins to respond. The receiver stores the received prefix and a descriptor corresponding to the handshake, among the sequence of different handshakes, which causes the transmitter to begin signaling. Subsequent signals with a stored prefix are greeted immediately with the associated stored handshake. This results in a reduced wait by the transmitter to begin transmission and the elimination of extraneous signals.

DESCRIPTION OF THE INVENTION

Figure 1:
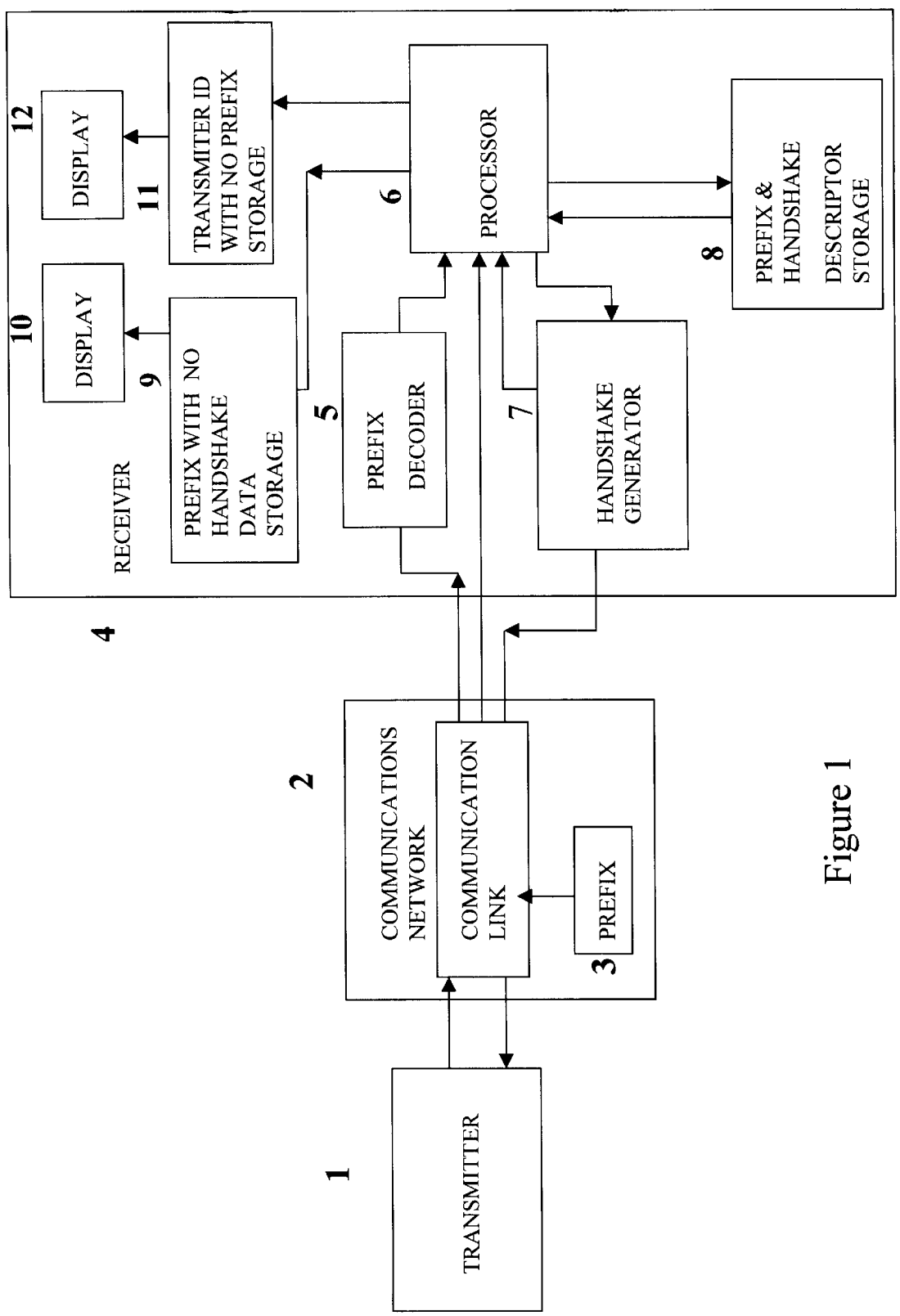
FIG. 1 shows a Transmitter linked to a Receiver by a communications network wherein a Prefix is inserted and in which the Receiver deletes all but the handshake which corresponds to the Prefix.

The location or other description of the source of transmissions is often known to the transmission network. This information may be inserted into the communications link as a prefix independent of data originating from the transmitter. The form of this prefix may be GPS (Global Positioning System) data in a satellite communications link, ANI (Automatic Number Identification) or CID (Caller Identification) in a telephone link, and other particular identification schemes such as calling card or billing card number in direct or proprietary links. The prefix is separate from transmitter data and may be presented to the receiver prior to establishing a connection from transmitter to receiver. A multi-format receiver may emit a sequence of different handshakes to elicit a response from the transmitter. When a call is first received from a transmitter, the receiver notes the prefix and upon connection emits its full sequence of different handshakes until the receiver starts to receive data from the transmitter. The receiver stops its handshake sequence immediately upon the start of a response from the transmitter, and notes the last handshake, which is the handshake that caused the transmitter to respond. The prefix and a descriptor of the corresponding receiver handshake are stored in association with each other in the receiver. Upon receipt of a prefix already stored, the receiver emits the associated receiver handshake only. Other handshakes are deleted from the sequence. When a call is received and a new prefix is received which is not found in storage, and to which there is no subsequent response to the handshake sequence, the new prefix is stored in a special file and this prefix is displayed on a printer, a LED or LCD display or sent to an external device. Such an occurrence may signify a transmitter malfunction, a system problem, or an unintended connection.

When a call is received with no prefix, the full sequence of handshakes is emitted. The identification of transmitters with no prefix which respond to the handshake sequence is stored in a special file. The identification of such transmitters is part of the data received from the transmitter. This transmitter identification may be displayed on a printer, a LED or LCD display or sent to an external device. Such an occurrence may signify a system problem or a transmitter which is outside the prefix identifying network.

A PREFERRED EMBODIMENT OF THE INVENTION

A Transmitter 1 is connected to a Communications Network 2 capable of inserting a Prefix 3 into the communication link. The Prefix is inserted to precede the transmitter data stream. The Receiver 4 contains elements 5 through 12. A Prefix Decoder 5 is connected to a Processor 6 and which Processor controls Handshake Generator 7 in its generation of a sequence of handshakes following receipt of a Prefix. The Processor directs the Handshake Generator to send a full sequence or a single handshake chosen from the sequence. The Processor determines the handshake associated with a received Prefix by determining the last in the sequence of handshakes before the transmitter begins to respond. The transmitter response is sent from the Transmitter to the Receiver by means of the Communications Network. The Processor sends to Storage Device 8 the received Prefix and a descriptor of the associated handshake. Upon receipt of a Prefix already stored in Storage Device 8, the Processor deletes all handshakes from the Handshake Generator other than the associated handshake stored with the just received Prefix. Storage means 9 and Display means 10 provide storage and display of prefix received by the Processor with no response to the handshake sequence. Storage means 11 and Display means 12 store and display transmissions identifiers received by the Processor without prefix.

---

Sequence Listing
Specification: 7 pages
Background of the Invention
Summary of the Invention
Description of the Invention
1 Claim
Abstract
Drawing
Drawing: One figure

---

What is claimed is:

1. A signaling arrangement using a communications network between a transmitter and a receiver in which a prefix is transmitted to locate or describe the transmitter where said prefix is sent to the receiver independently before the transmitter begins to send a message, comprising:

a. a decoder in the receiver to decode said prefix b. a generator of a sequence of different handshakes in the receiver to initiate a response from transmitters having one of a plurality of protocols and formats c. a processor to identify the handshake in said sequence of different receiver handshakes which caused the transmitter to respond after an associated prefix was received, and to delete all handshakes from the handshake generator other than the associated handshake when a prefix which is already stored is received d. storage means to store a prefix and an associated handshake descriptor e. a first display means for displaying a prefix received with no data with no valid transmitter response f. a second display means for displaying transmitter data received without a prefix.

* * * * *